A. W. FAIRCHILD.
WAGON SCALE.
APPLICATION FILED SEPT. 29, 1909.
976,351.
Patented Nov. 22, 1910.
3 SHEETS—SHEET 1.
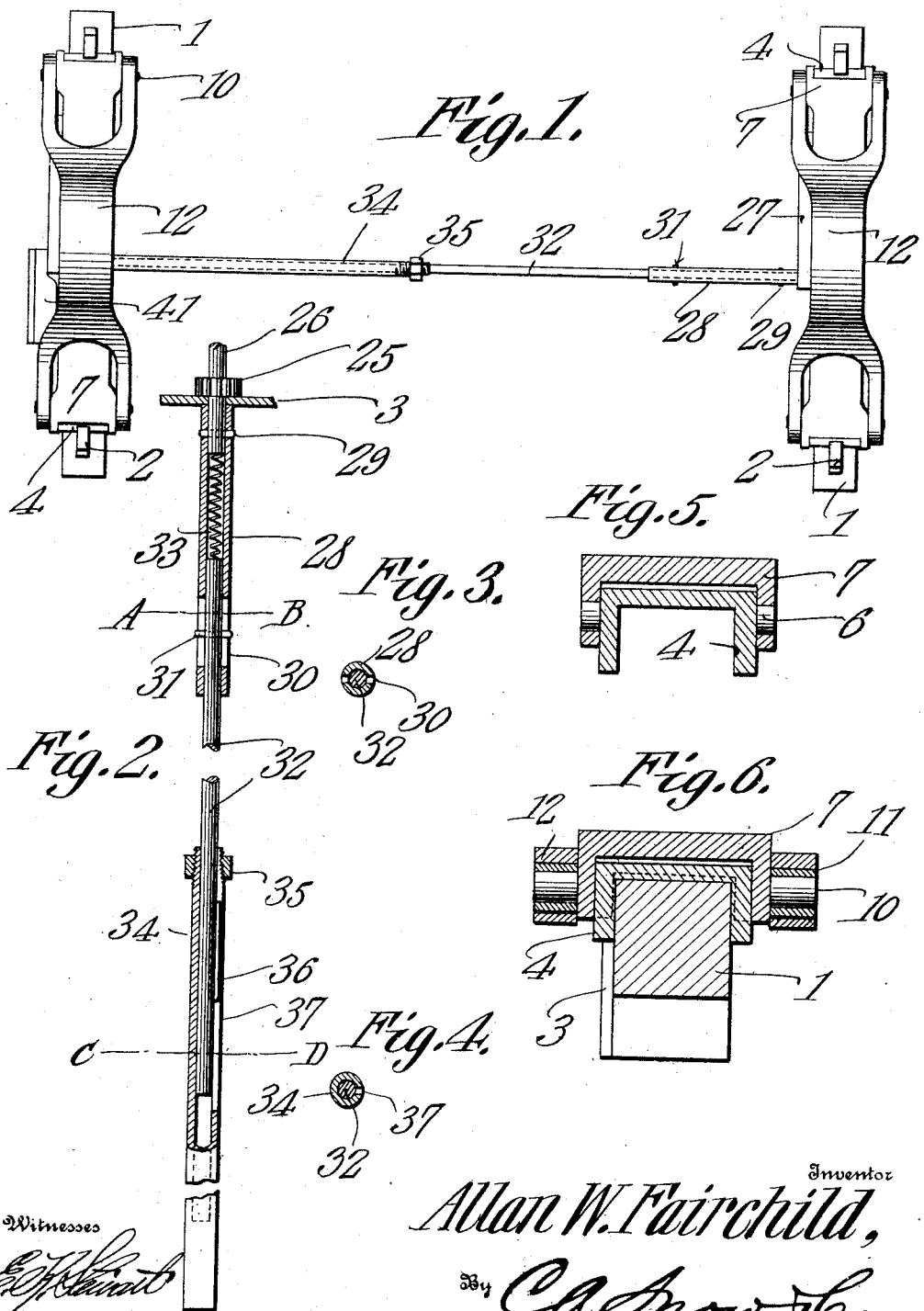
Witnesses
Inventor
Allan W. Fairchild,
By C. A. Snow & Co.
Attorneys

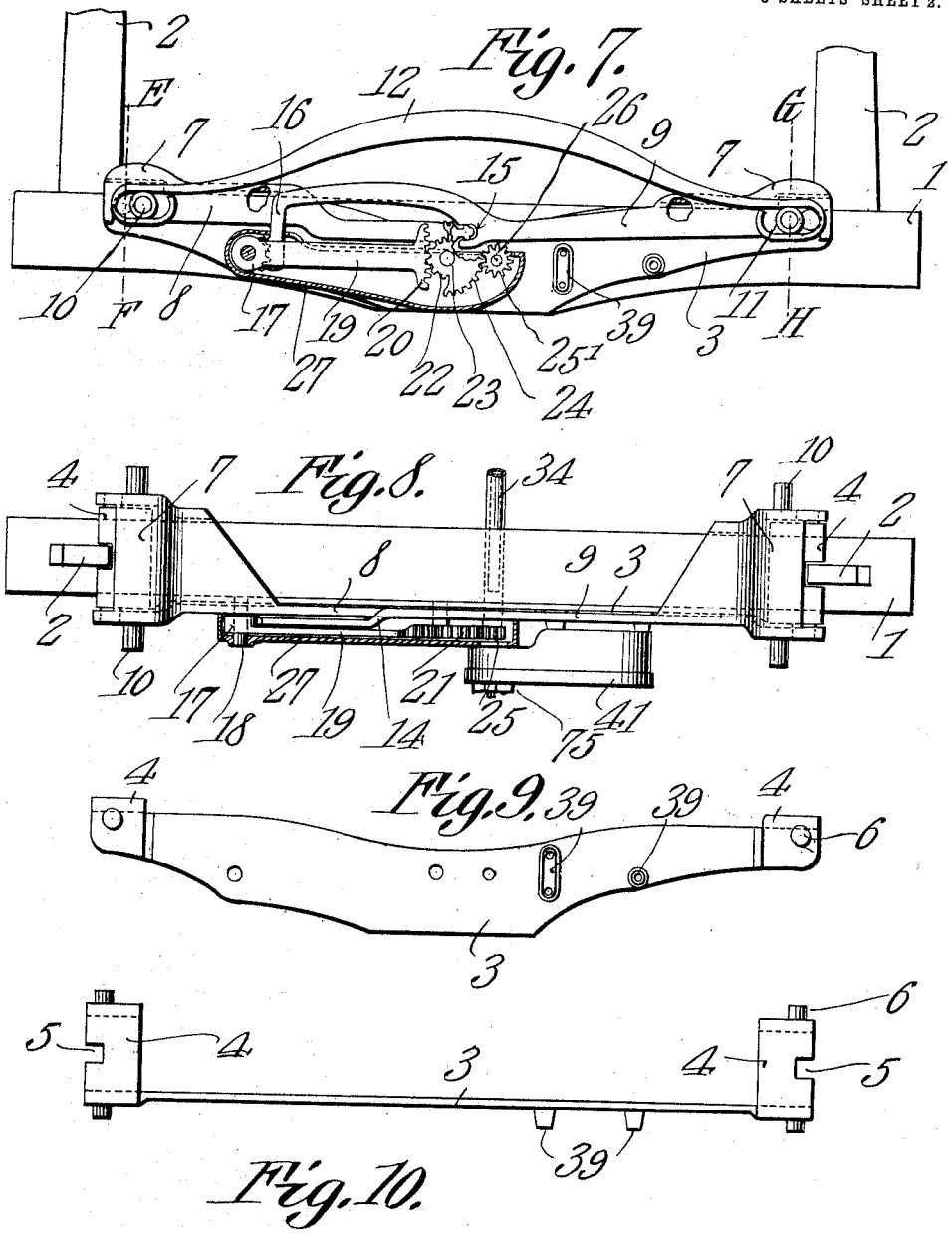

A. W. FAIRCHILD.
WAGON SCALE.
APPLICATION FILED SEPT. 29, 1909.

976,351.

Patented Nov. 22, 1910.
3 SHEETS—SHEET 3.

WITNESSES

Inventor
Allan W. Fairchild,
By C. A. Snow & Co.
Attorneys

UNITED STATES PATENT OFFICE.

ALLAN W. FAIRCHILD, OF NEEBISH, MICHIGAN, ASSIGNOR OF ONE-HALF TO JOHN O'DELL, OF NEEBISH, MICHIGAN.

WAGON-SCALE.

976,351.  Specification of Letters Patent.  Patented Nov. 22, 1910.

Application filed September 29, 1909. Serial No. 520,160.

*To all whom it may concern:*

Be it known that I, ALLAN W. FAIRCHILD, a citizen of the United States, residing at Neebish, in the county of Chippewa and State of Michigan, have invented a new and useful Wagon-Scale, of which the following is a specification.

The objects of the invention are, generally, the provision in a merchantable form, of a device of the above-mentioned class, which shall be inexpensive to manufacture, facile in operation, and devoid of complicated parts; specifically, the provision of a mechanism adapted to be assembled with the bolster of a wagon or sleigh, to indicate the weight of the load upon the wagon or sleigh, novel means being provided for receiving and for sustaining the weight, and for indicating such weight; other and further objects being made manifest hereinafter as the description of the invention progresses.

The invention consists in the novel construction and arrangement of parts hereinafter described, delineated in the accompanying drawings, and particularly pointed out in that portion of this instrument wherein patentable novelty is claimed for certain distinctive features of the device, it being understood, that, within the scope of what hereinafter thus is claimed, divers changes in the form, proportions, size, and minor details of the structure may be made, without departing from the spirit or sacrificing any of the advantages of the invention.

Similar numerals of reference are employed to denote corresponding parts throughout the several figures of the drawings.

Figure 11:
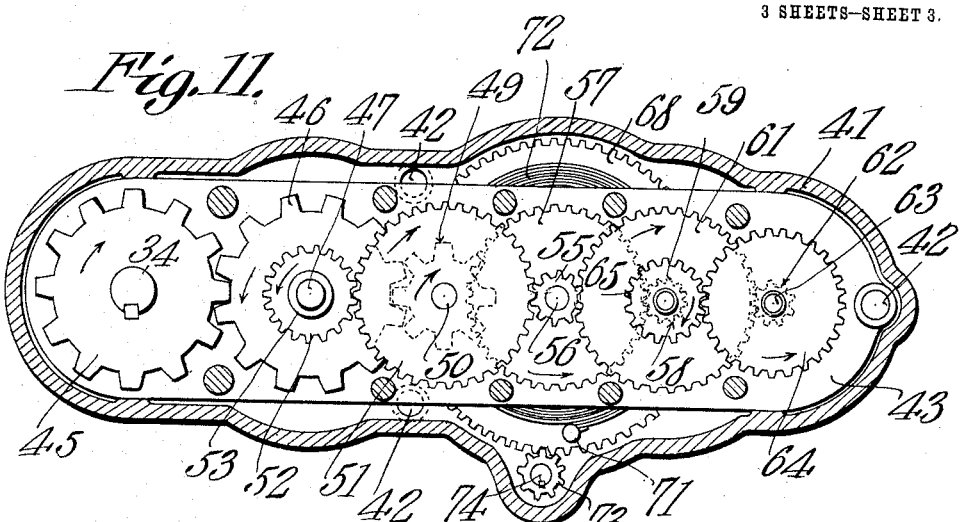
Figure 12:
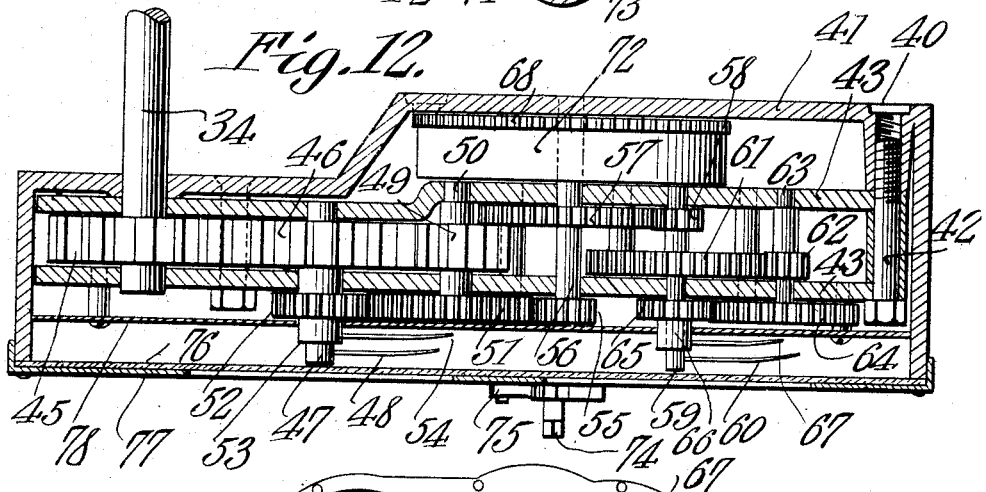
Figure 13:
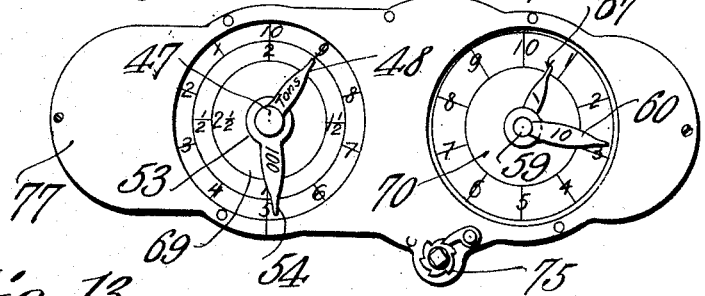

In the accompanying drawings, Figure 1 shows the invention in top plan; Fig. 2 is a top plan of the shaft whereby the weighing mechanism mounted upon the front bolster, is connected, operatively, with the weighing mechanism located upon the rear bolster, parts being broken away better to illustrate the structure; Fig. 3 is a transverse section on the line A—B of Fig. 2; Fig. 4 is a transverse section on the line C—D of Fig. 2; Fig. 5 is a transverse section on the line E—F of Fig. 7; Fig. 6 is a transverse section on the line G—H of Fig. 7; Fig. 7 is a rear elevation of the rear bolster and its attendant mechanism; parts being removed; Fig. 8 is a top plan of the portion of the device which is shown in Fig. 7; the recording mechanism being shown as an added detail. Fig. 9 is an elevation of one of the supporting plates; Fig. 10 is a top plan of the supporting plate shown in Fig. 9; Fig. 11 is an elevation of the weight indicating mechanism, parts being removed; Fig. 12 is a top plan of the weight indicating mechanism; and Fig. 13 is a front elevation thereof.

The weighing device forming the subject matter of this application is adapted to be mounted upon sleighs or wagons of any type. I have therefore, considered it sufficient to show only such portions of the wagon or sleigh as are directly connected to some portion of the mechanism which I have invented, and, with this end in view, there are shown in the several figures of the drawings, a pair of bolsters 1, provided with the usual side stakes 2.

The device, broadly speaking, may be said to consist of four mechanisms; a weighing device adapted to be mounted upon the front bolster, a weighing device adapted to be mounted upon the rear bolster, a shaft adapted to connect operatively the weighing mechanisms which are carried by the bolsters, and an indicator, from which the weight carried by both of the bolsters may be read off.

The weighing mechanisms which are carried by the bolsters, are, with some minor exceptions identical in construction. In Fig. 7, the rear face of the rear bolsters is shown and in Fig. 8, the top plan of the rear bolster, and from these figures the description of the bolster-carried mechanism may be read, it being understood, that, saving as otherwise pointed out, the description will apply with equal propriety to the weighing mechanism of the front bolster.

Mounted upon the rear face of the bolster 1 is a plate 3, provided, terminally, with rectangularly disposed heads 4, adapted to rest upon the upper face of the bolster 1 to support the plate 3. These heads 4 are provided with notches 5 adapted to receive the side stakes 2, and from the heads 4 extend laterally, studs 6. These studs 6 are adapted to serve as fulcrums to receive the heads 7 of levers 8 and 9, the levers 8 and 9 being thus supported pivotally at their remote ends upon the plate 3, the adjacent ends of the levers 8 and 9 extending toward the middle of the vehicle.

The heads 7 of the levers 8 and 9 are provided with laterally extending studs 10, located slightly nearer to the center line of the vehicle than the studs 6 of the plate 3. Mounted upon the studs 10 of the levers, are collars 11, adapted to receive, as shown in Figs. 6 and 7, the extremities of the springs 12, which, in their turn, support the body of the vehicle and its superposed load.

The lever 9 is somewhat longer than the lever 8, and, as shown in Fig. 8, is bent rearwardly, intermediate its ends, as denoted by the numeral 14, whereby the down-turned end 16 of the lever 9 may be disposed to the rear of the lever 8. Adjacent the portion 14, the lever 9 is provided with a notch 15 adapted to receive the free extremity of the lever 8. The portion 16 of the lever 9 is provided with a rack adapted to mesh with a pinion 17 journaled for rotation upon a stub shaft 18, mounted in the plate 3. This pinion 17 carries an arm 19, extending toward the center line of the vehicle, and terminally provided with a rack 20, in engagement with the smaller segment 22 of a broken pinion 21, rotatably mounted upon a stub shaft 23 carried by the plate 3. The larger segment 24 of the broken pinion 21 is in mesh with a pinion 25′ secured to a shaft rotatably mounted in the plate 3, near the center line of the vehicle, the shaft being denoted by the numeral 34. Recalling that the description is being applied specifically to the rear bolster, it will be noted upon an examination of Fig. 8, that the shaft 34 is extended rearwardly to protrude beyond the rear bolster, being operatively connected in its extended portion, with an indicator mechanism which will be described hereinafter. The shaft 34 is extended forwardly, and constitutes an operative connection between the weighing mechanism hereinbefore described, and a like weighing mechanism which is carried by the forward bolster.

Passing now to a description of the means whereby the weighing mechanism of the rear bolster is connected with the similar weighing mechanism of the front bolster, and referring particularly to Fig. 2, it will be seen that the shaft 34 at its forward end is rendered tubular to receive, slidably, the rear end of a rod 32, provided with a spline 36, adapted to reciprocate in a longitudinally disposed opening 37 in the tubular portion of the shaft 34. The forward extremity of the tubular portion of the shaft 34 is split longitudinally and tapered to receive a nut 35, whereby the end of the shaft 34 may be clamped upon the rod 32, the foregoing construction furnishing a means whereby the device may be adjusted for vehicles of different dimensions between the bolsters. Slidably mounted upon the forward end of the rod 32 is a tubular member 28, provided with longitudinally disposed slots 30 in which is adapted to reciprocate, a pin 31 transversely secured in the forward end of the rod 32. The pinion 25 of the front bolster which corresponds to the pinion 25′ of the rear bolster is mounted upon a shaft 26, secured by means of a pin 29 or the like, to the forward end of the tubular member 28, a compression spring 33 being interposed between the ends of the members 26 and 32. By the construction last above-described, although the connection between the weighing mechanisms, of the two bolsters is rigid against a torsional strain, it is adapted to yield longitudinally, to provide for any slight independent movement in the weighing mechanism of the two bolsters.

The extremities of the levers 8 and 9, together with the intermeshing elements which they carry, are suitably housed within a casing 27, against mud or snow, and the plate 3 which is mounted upon the rear bolster is provided with studs 39 adapted to register in openings 40 in a casing 41, shown in Figs. 11, 12 and 13, bolts 42 serving to hold the casing 41 in place upon the studs, and disposed upon the rear face of the rear bolster. The portion of the shaft 34 which extends to the rear of the rear bolster, enters the casing 41 as shown in Fig. 12, being rotatably mounted in spaced upright plates 43 secured within the casing 41.

Located between plates 43 and secured to the shaft 34, is a pinion 45 meshed with a pinion 46 secured to a shaft 47. The rear end of the shaft 47 carries a hand 48 adapted to register upon a retrograde dial 69. The pinion 46 is in mesh with a smaller pinion 49 secured to a shaft 50, the shaft 50 carrying in its rotation, a pinion 51, of approximately the same dimensions as the pinions 45 and 46, but provided with a larger number of teeth, the pinion 51 being enmeshed with a smaller pinion 52, secured to a tubular shaft 53 mounted for rotation upon the shaft 47 and carrying a hand 54 adapted to register upon the retrograde dial 69.

The pinion 51 is in mesh with a pinion 55 secured upon a shaft 56, the shaft 56 carrying, in its rotation, a pinion 57, in mesh with a pinion 58, secured to a shaft 59, the shaft 59, at its rear end carrying a hand 60 adapted to register upon the direct dial 70. The shaft 59 carries in its rotation, a pinion 61 in mesh with a smaller pinion 62, secured to a shaft 63, carrying in its rotation a larger pinion 64, in mesh with a pinion 65, secured to a tubular shaft 66, mounted for rotation upon the shaft 59, and carrying a hand 67 adapted, like the hand 60, to register upon the direct dial 70.

Located between one of the plates 43 and the forward face of the casing 41, and rotatably mounted upon the shaft 56, is a pinion 68, provided adjacent its periphery with an outstanding pin 71, to which is attached one end of a coiled spring 72, the other end of which is secured to the shaft 56. Located in the bottom of the casing 41 is a pinion 73 in mesh with the pinion 68, and secured upon a shaft 74, rotatably mounted in the casing 41. The shaft 74 is squared to receive a winding key, and a pawl and ratchet mechanism 75 limits the movement of the shaft 74.

The operation of the device is as follows:—When a weight is superposed upon the springs 12, the springs, bearing upon the studs 10 of the levers 8 and 9, between the fulcrum points 6 of the levers, will force the adjacent ends of the levers 8 and 9 downwardly, the inner end of the lever 8 engaging the lever 9 at the notch 15, the rack carried by the end 16 of the lever 9 engaging the pinion 17, causing the inner end of the arm 19 which is carried by the pinion 17 to move downwardly, the rack 20 engaging the small segment 22 of the broken pinion 21 and giving a left-hand rotation to the pinion 21, the large segment 24 of which will impart a right-hand movement to the pinion 25′ of the rear bolster and to the pinion 25 of the front bolster.

Referring to Figs. 11 and 12 it will be seen that a right-hand rotation of the pinions 25 and 25′ will cause a right-hand rotation of the shaft 34, causing a right-hand rotation in the pinion 45, a left-hand rotation in the pinion 46, and in the shaft 47, causing the hand 48 to move in retrograde rotation upon the dial 69. A left-hand rotation in the pinion 46 will cause a right-hand rotation in the pinions 49 and 51, causing a left-hand rotation in the pinion 52 and in the tubular shaft 53, causing the hand 54 to pass in retrograde movement over the face of the dial 69.

The right-hand rotation in the pinion 51 will cause a left-hand rotation in the pinions 55 and 57, winding up the spring 72 and causing a right-hand rotation in the pinion 58 and in the shaft 59, causing the hand 60 to move over the face of the direct dial 70. The right-hand rotation of the shaft 59 will cause a right-hand rotation in the pinion 61, which will be transformed into a left-hand rotation in the pinions 62 and 64, causing a right-hand rotation in the pinion 65 and in the tubular shaft 66, causing the hand 67 to move over the face of the direct dial 70.

By properly proportioning the pitch of the teeth of the several pinions, and by properly adjusting the diameters of the several pinions, the hand 48 may be made to register the weight in tons, the hand 54 the number of hundredweight, the hand 60 the tens, and the hand 67 the units. Or, if desired, any other arbitrary system for graduating the dials 69 and 70 may be employed.

The plate 78 upon which the dials 69 and 70 are inscribed, may be protected by a glass or celluloid plate 76, the latter being protected by an exterior metal plate 77, having openings of approximately the same size as the dials.

In adjusting the device when it is first applied to the vehicle, the pawl and ratchet mechanism 75 are thrown out of connection with the shaft 74 and the shaft is rotated, by means of a suitable key, the small pinion 73, engaging the larger pinion 68, will wind up the spring 72, until the tension therein equals the weight of the wagon-box which is superposed upon the springs 12. The several hands 48, 54, 67, and 60 will then stand at zero, and subsequent readings upon the dials 69 and 70 will indicate only the load which is carried in the wagon-box, and not the combined weight of the load and the wagon-box.

In order that the following claims may be clearly understood, I will explain at this point, that those ends of the several levers, which are disposed toward the sides of the vehicle, and in the vicinity of the wheels thereof, will be denominated the "remote ends;" while those ends of the levers which are extended inwardly from the sides of the vehicle toward the longitudinal center thereof, will be denominated "adjacent ends."

Having thus described my invention, what I claim as new and desire to protect by Letters Patent is:—

1. In a device of the class described, a supporting plate; levers fulcrumed at their remote ends upon the supporting plate, the inner end of one of said levers being pivotally interlocked with the intermediate portion of the other of said levers; weight-indicating mechanism; an operative connection between the adjacent end of the last-named lever and the weight-indicating mechanism for actuating the same; and a weight-supporting compression spring arranged to bear terminally upon the levers intermediate their fulcrums and their point of interlocking.

2. In a device of the class described, a supporting plate; levers having their remote ends fulcrumed upon the supporting plate, the adjacent end of one lever being pivotally interlocked with the intermediate portion of the other lever; a shaft journaled for rotation in the plate; weight-indicating mechanism operatively connected with the shaft; means operatively connecting the adjacent end of the last-named lever with the shaft to secure a rotation of the same; and load-receiving means bearing upon the levers intermediate their fulcrums and their point of interlocking.

3. In a device of the class described, a supporting plate; levers fulcrumed at their remote ends upon the supporting plate, the adjacent end of one lever being pivotally interlocked with the intermediate portion of the other lever; a pinion mounted for rotation on the plate; a rack carried by the adjacent end of the last-named lever and in mesh with the pinion; an arm carried by the pinion; and weight-indicating mechanism operable by the arm.

4. In a device of the class described, a supporting plate; levers fulcrumed at their remote ends upon the supporting plate, the adjacent end of one lever being pivotally interlocked with the intermediate portion of the other lever; a shaft journaled for rotation in the plate; weight-indicating mechanism operable by the shaft; a pinion rotatably carried by the plate; a rack carried by the adjacent end of the last-named lever and in mesh with the pinion; an arm carried by the pinion; and means operatively connecting the arm with the shaft to secure a rotation of the latter upon a reciprocation of the former.

5. In a device of the class described, a supporting plate; levers fulcrumed at their remote ends upon the supporting plate, the adjacent end of one lever being pivotally interlocked with the intermediate portion of the other lever; a shaft journaled for rotation in the plate; weight-indicating mechanism operatively connected with the shaft; a pinion rotatably mounted upon the plate; a rack carried by the adjacent end of the last-named lever and in mesh with the pinion; an arm carried by the pinion and terminally provided with a rack; and a gear train connecting the rack with the shaft.

6. In a device of the class described, a supporting plate; levers fulcrumed at their remote ends upon the supporting plate, the adjacent end of one lever being pivotally interlocked with the intermediate portion of the other lever; a shaft journaled for rotation in the plate; weight-indicating mechanism operable by the shaft; a pinion carried by the shaft; a pinion rotatably carried by the plate; a rack carried by the adjacent end of the last-named lever and in mesh with the pinion upon the plate; an arm carried by the last-named pinion and terminally provided with a rack; and a broken pinion mounted for rotation upon the plate and having its smaller segment in mesh with the rack of the arm and its larger segment in mesh with the pinion upon the shaft.

7. In a device of the class described, a supporting plate; a shaft journaled for rotation in the plate; weight-indicating mechanism operable by the shaft; a pinion carried by the shaft; a broken pinion rotatably carried by the plate and having its larger segment in mesh with the pinion upon the shaft; an arm pivoted at one end to the plate and provided at its other end with a rack to engage the smaller segment of the broken pinion; and weight-supporting levers operatively connected with the arm.

8. In a device of the class described, an upright supporting plate having laterally extending heads terminally provided with stake-receiving notches and with laterally extending studs; interlocking levers terminally fulcrumed upon the studs; and weight-indicating mechanism mounted upon the plate and operable by the levers.

9. In a device of the class described, a supporting plate having laterally extending heads provided with laterally extending studs; interlocking levers terminally fulcrumed upon the studs and provided with studs located between the studs of the heads; a spring carried by the studs of the levers; and weight-indicating mechanism mounted upon the plate and operable by the levers.

10. In a device of the class described, spaced supporting plates; levers having their remote ends fulcrumed upon the plates, the adjacent end of one member of each pair of levers being pivotally interlocked with the intermediate portion of the other lever of each pair; a longitudinally extensible shaft connecting the plates; weight-indicating mechanism operatively connected with the shaft; and means operatively connecting the shaft with the adjacent ends of the last-named levers of each pair to secure a rotation of the shaft upon a reciprocation of the levers.

11. A weight-indicator comprising spaced dials; a drive shaft; auxiliary shafts extending through the dials; hands carried by the auxiliary shafts and arranged to register upon the dials; a gear train uniting the drive shaft with the intermediate shafts to register successive gradations upon the dials; resilient counterpoise means connected with the gear train and arranged to offset the effort of the drive shaft; means for adjusting the counterpoise means to set the hands at zero upon the dials.

12. In a device of the class described, a supporting plate; a shaft journaled for rotation in the plate; weight-indicating mechanism operable by the shaft; a pinion carried by the shaft; a pinion consisting of a large segment and a small segment rotatably carried by the plate and having its large segment in mesh with the pinion upon the shaft; an arm pivoted at one end to the plate and provided at its other end with a rack to engage the small segment of the broken pinion; and weight-supporting means operatively connected with the arm.

In testimony that I claim the foregoing as my own, I have hereto affixed my signature in the presence of two witnesses.

ALLAN W. FAIRCHILD.

Witnesses:
BERNICE V. FOSTER,
AMY C. RAMSEY.